United States Patent [19]

Tang

[11] Patent Number: 4,833,836
[45] Date of Patent: May 30, 1989

[54] PROCESS FOR GRINDING A GEAR TOOTH BLANK TO FORM AN INVOLUTE GEAR TOOTH

[75] Inventor: Ming Tang, Taichung, Taiwan

[73] Assignee: Metal Industries Development Centre, Kaohsiung City, Taiwan

[21] Appl. No.: 80,481

[22] Filed: Jul. 31, 1987

[51] Int. Cl.⁴ ............................................. B24B 1/00
[52] U.S. Cl. .................. 51/287; 51/165.71; 51/123 G
[58] Field of Search ............ 51/287, 327, 52 R, 56 G, 51/33 W, 123 G, 165.71

[56] References Cited

U.S. PATENT DOCUMENTS 3,986,305 10/1976 Gunter ................................. 51/287
4,467,568 8/1984 Bloch .................................. 51/52 R

FOREIGN PATENT DOCUMENTS 2462350 11/1976 Fed. Rep. of Germany ..... 51/56 G

Primary Examiner—Frederick R. Schmidt
Assistant Examiner—Robert A. Rose
Attorney, Agent, or Firm—Limbach, Limbach & Sutton

[57] ABSTRACT

A process for grinding a gear tooth blank to form an involute gear tooth includes the steps: setting a predetermined cutting rate which fails to result in burning between a grinding wheel and the gear tooth blank; determining the area of the tooth face of the gear tooth blank to be removed for respective grinding strokes in accordance with the predetermined cutting rate so that the metal removal amount of respective grinding strokes approaches to a constant except that the metal removal amount of the last grinding stroke may be smaller than the constant; and effecting the relative involute generating movement between the gear tooth blank and the grinding wheel in accordance with the respective areas of the tooth face to be removed for removing the metal within the respective areas from the gear tooth blank in a step-by-step manner to form an involute gear tooth.

4 Claims, 8 Drawing Sheets

FIG_7

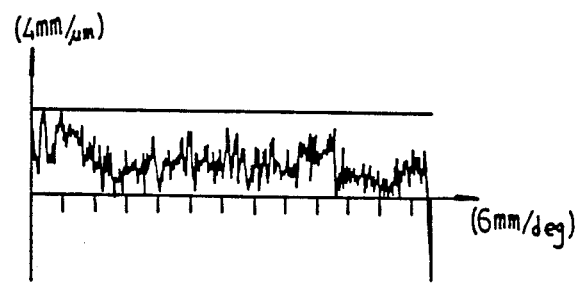
FIG_12
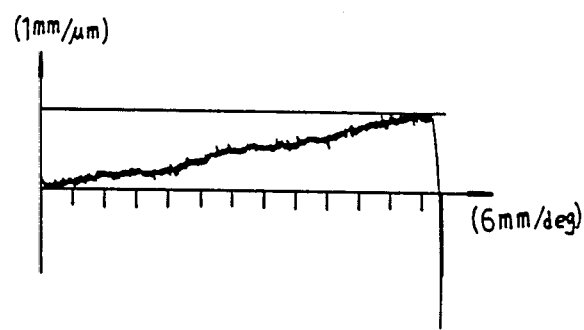
FIG_13

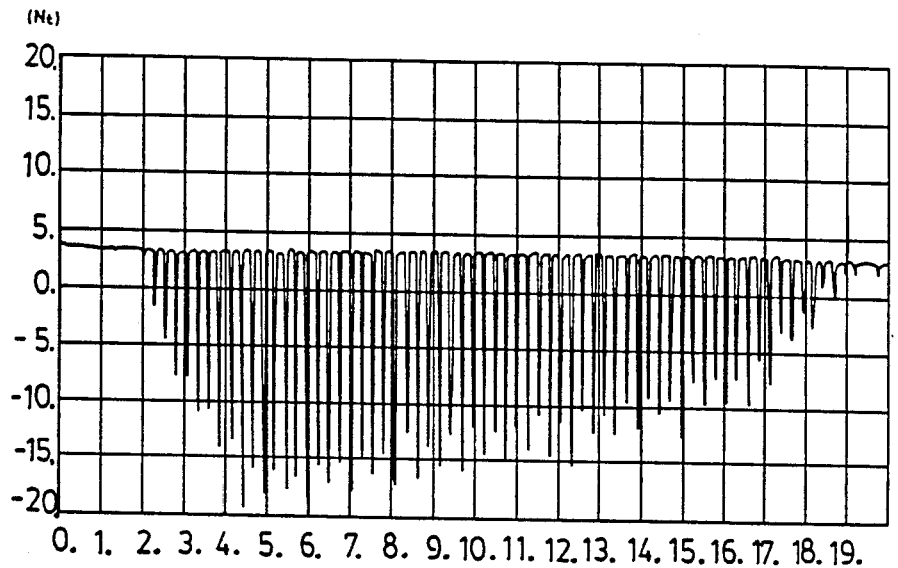
FIG_14
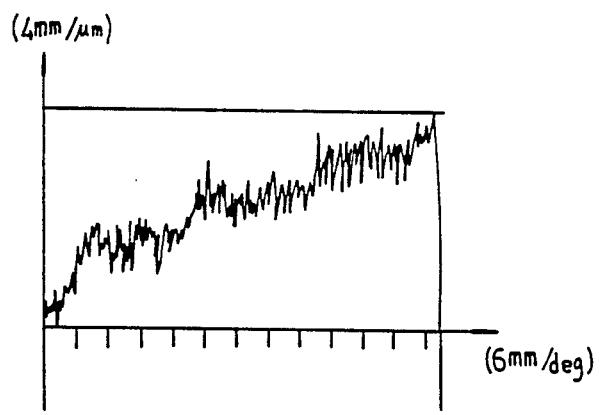
FIG_15

PROCESS FOR GRINDING A GEAR TOOTH BLANK TO FORM AN INVOLUTE GEAR TOOTH

BACKGROUND OF THE INVENTION

The present invention relates to a process for grinding a gear tooth blank to form an involute gear tooth, and more particularly to a process for grinding a gear tooth blank at constant cutting rate to form an involute gear tooth.

Most precision gears for use in the industry are involute gears. Referring to FIG. 1, in common practice, to grind a gear tooth blank to form an involute gear tooth, the gear tooth blank effects a constant angular displacement prior to each grinding stroke during which it is ground by a grinding wheel which moves across the space between two gear teeth of the gear blank. The rotational angle for each grinding stroke is designated at B. Since the angular displacement for each grinding stroke is a constant, the removed area of one tooth face of the gear blank during each grinding stroke is variable within a broad range, as shown in FIG. 2. This largely variable cutting rate causes the action force between the grinding wheel and the workpiece, i.e. the cutting force, to vary within a broad range, as shown in FIG. 3. Further, this largely variable cutting force may result in the partial deformation of the abrasive grains of the grinding wheel and in the undesired displacement between the workpiece and the grinding wheel during grinding operation, thereby resulting in the errors of the involute, the tooth profile, and the pitch, as shown in FIG. 4. Additional machining is needed which results in a lower rating of production.

In addition, since the center of each gear tooth blank is generally located at an eccentric distance in relation to the center of the gear blank, the metal removal amount for respective grinding strokes is largely varied. The errors of the involute, the tooth shape, and the pitch thus become uncontrollable. When some of these errors are irreconcilable, the gear may become useless.

SUMMARY OF THE INVENTION

It is therefore the main object of the present invention to provide a process for grinding a gear tooth blank at a constant cutting rate to form efficiently an involute gear tooth.

According to the present invention, the process for grinding a gear tooth blank to form an involute gear tooth includes the steps:

setting a predetermined cutting rate which fails to result in burning between a grinding wheel and the gear tooth blank;

determining the area of the tooth face of the gear tooth blank to be removed for respective grinding strokes in accordance with the predetermined cutting rate so that the metal removal amount of respective grinding strokes approaches to a constant except that the metal removal amount of the last grinding stroke may be smaller than the constant;

effecting the relative involute profile generating movement between the gear tooth blank and the grinding wheel in accordance with the respective areas of the tooth face to be removed for removing the metal within the respective areas from the gear tooth blank in a step-by-step manner to form an involute gear tooth.

BRIEF DESCRIPTION OF THE DRAWINGS

Other features and advantages of the present invention will become apparent from the following detailed description of a preferred embodiment of the present invention with reference to the accompanying drawings in which:

FIG. 12 illustrates the error of the tooth shape of the first gear tooth blank after machining in the test performed according to the process of the present invention;

FIG. 13 illustrates the profile error of the tooth shape for a second gear tooth blank prior to machining;

FIG. 14 illustrates the cutting force of respective grinding strokes in a test for grinding the second gear tooth blank to form an involute gear tooth in a test performed according to the conventional process;

FIG. 15 illustrates the profile error of the tooth shape of the second gear tooth blank after machining in the test performed according to the conventional process.

DETAILED DESCRIPTION OF THE PREFERRED EMBODIMENT

Figure 1:
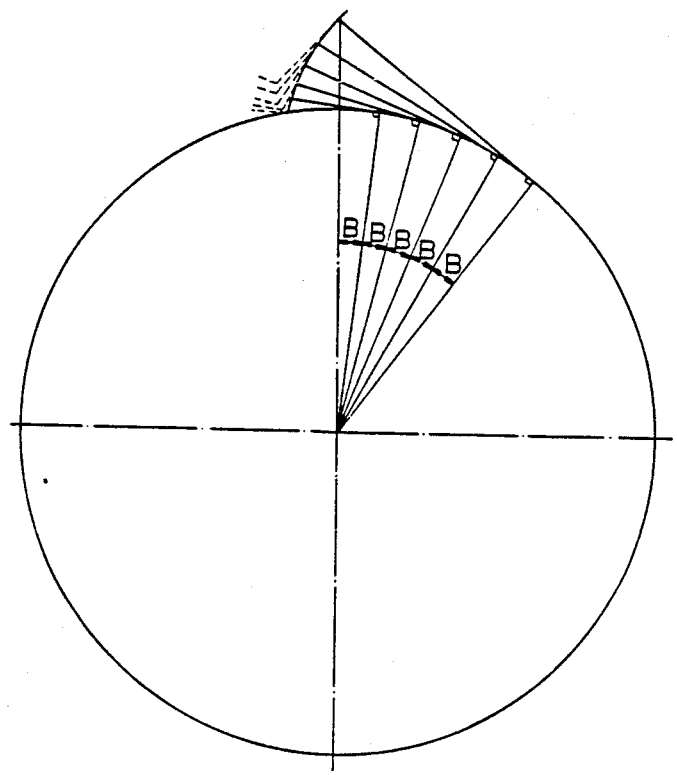
FIG. 1 illustrates the conventional constant angular displacement method of a gear tooth blank for each grinding stroke when a grinding wheel advances in a direction toward it.
Figure 2:
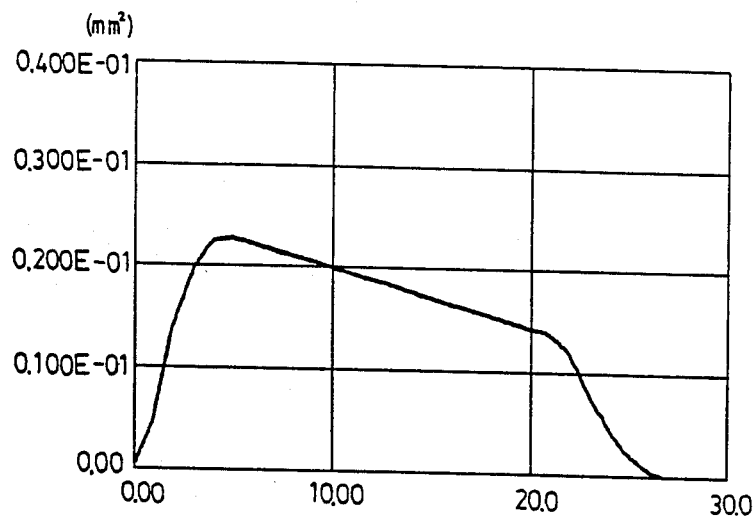
FIG. 2 illustrates the variation of the removed area of the tooth face of the gear tooth blank for respective grinding strokes according to prior art.
Figure 3:
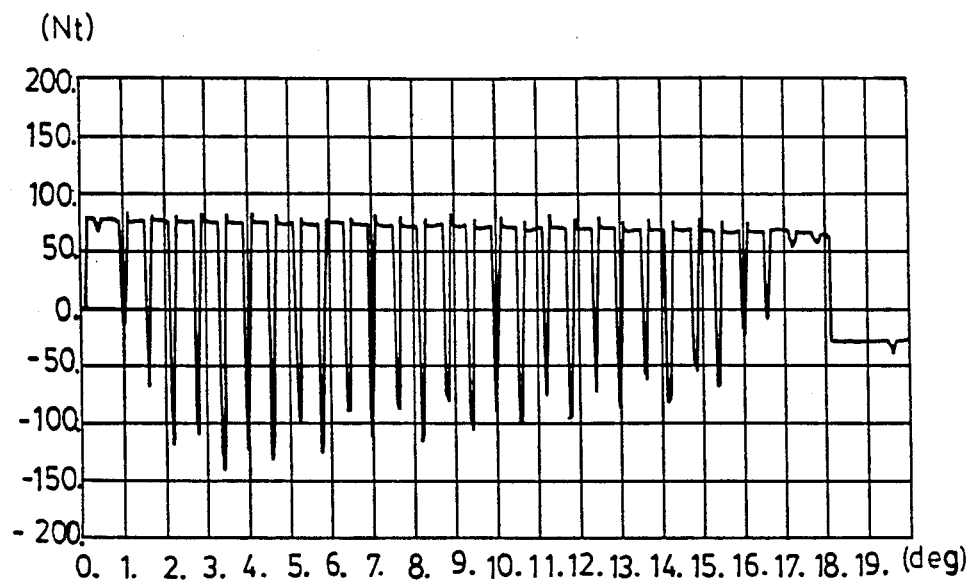
FIG. 3 illustrates the variation of the cutting force for respective grinding strokes according to prior art, in which the longitudinal axis shows the cutting force (its unit is newton) and the transverse axis shows the rotational angle of the gear tooth blank (its unit is degree)
Figure 4:
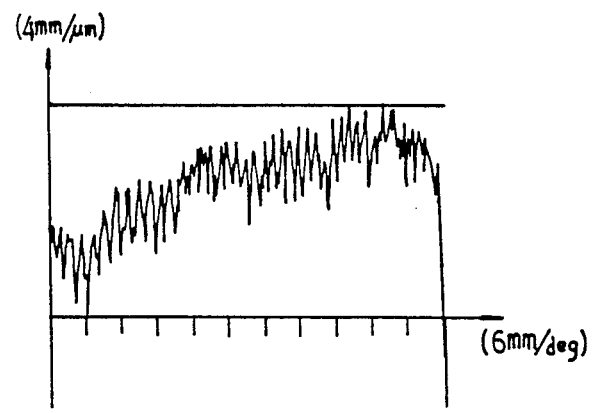
FIG. 4 illustrates the error of the tooth profile of a gear tooth blank after machining according to the conventional process.
Figure 5:
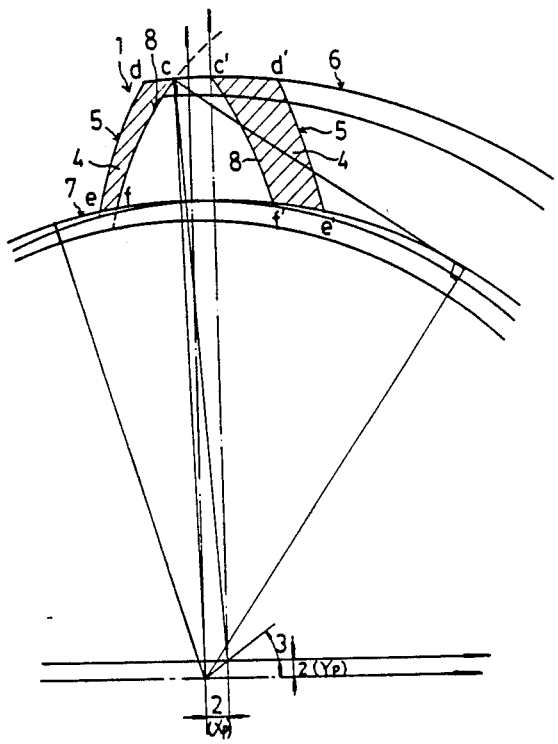
FIG. 5 illustrates the areas of a gear tooth blank to be removed, which are shown in two shaded areas.

Referring to FIG. 5, there is shown a tooth face. According to the present invention, the eccentric distances 2(Xp) and 2(Yp) and orientation angle 3 of a gear tooth blank 1 are measured prior to grinding. Based on these measurements, the excess areas 4 are determined by a computer. The excess areas 4 includes area cdef and area c'd'e'f', which are defined by original involutes 5, addendum circle 6, dedendum circle 7, and proper involutes 8.

To maintain constant cutting force, preset prior to machining is a suitable cutting rate, that is, the amount of the metal to be removed from the gear tooth blank 1 during one grinding stroke, which must fail to result in burning between the gear tooth blank and the grinding wheel.

Figure 6:
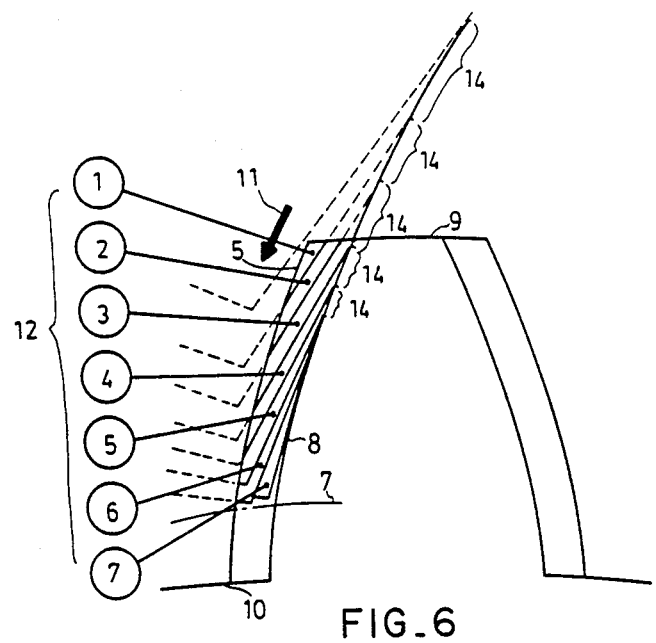
FIG. 6 illustrates the possible shape of the removed area of the tooth face for respective grinding strokes when the gear blank is ground from a tooth crest to a tooth flank.
Figure 7:
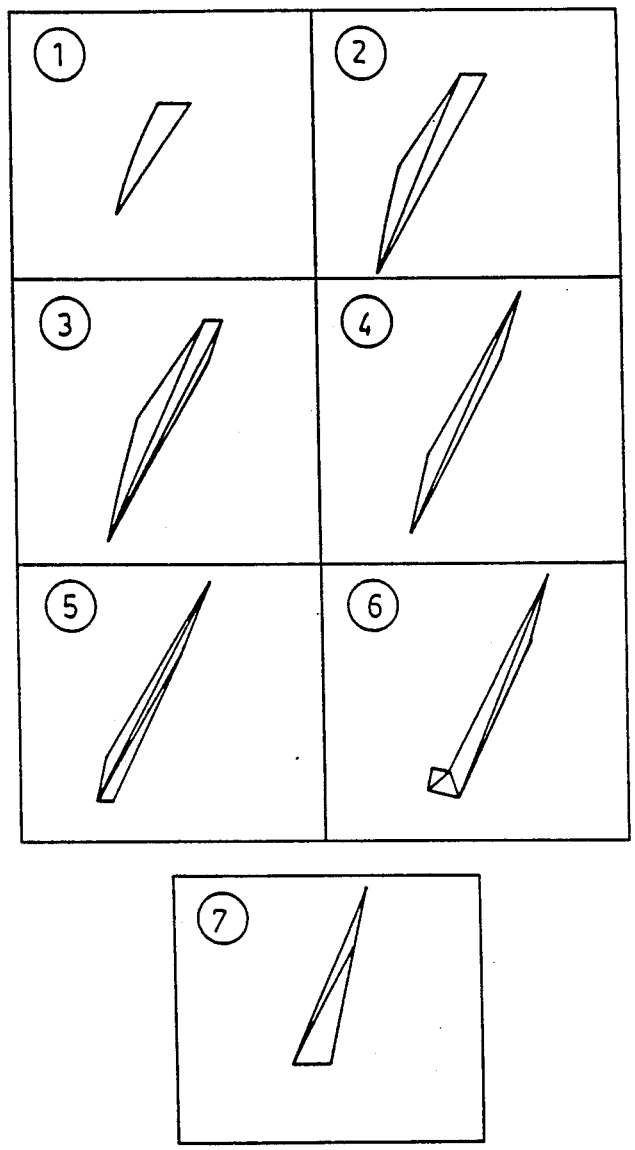
FIG. 7 illustrates how the areas to be removed for respective grinding strokes are divided into triangular areas.
Figure 9:
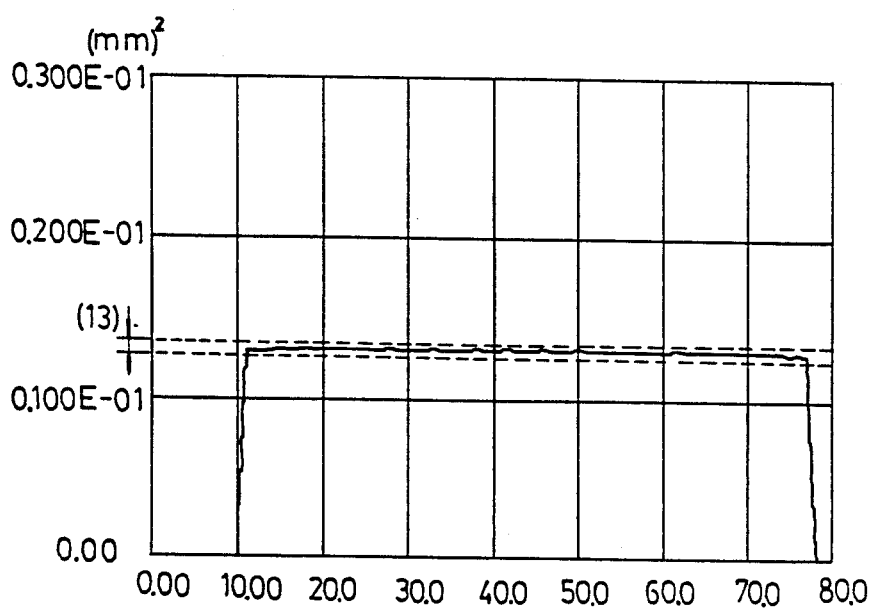
FIG. 9 illustrates the removed area of the tooth face of a gear tooth blank for respective grinding strokes according to the process of the present invention.
Figure 10:
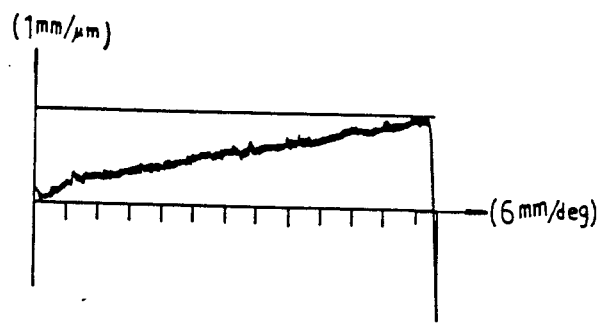
FIG. 10 illustrates the profile error of the tooth shape for a first gear tooth blank prior to machining.

Referring to FIG. 6, in a grinding process, when the gear tooth blank is ground from a tooth crest 9 to a tooth flank 10, i.e. in a direction 11, the removed area of the tooth face for respective grinding strokes may be seven shapes 12. The total area of the shapes 12 can be calculated by dividing them into a plurality of triangular areas, as shown in FIG. 7. The total area is then divided by the predetermined number of grinding strokes, which is 76 in this embodiment so as to determine the area of the tooth face to be removed for each grinding stroke. Referring to FIG. 9, the removed area of the tooth face for respective grinding strokes other than the last grinding stroke thus approachs to a constant.

Figure 8:
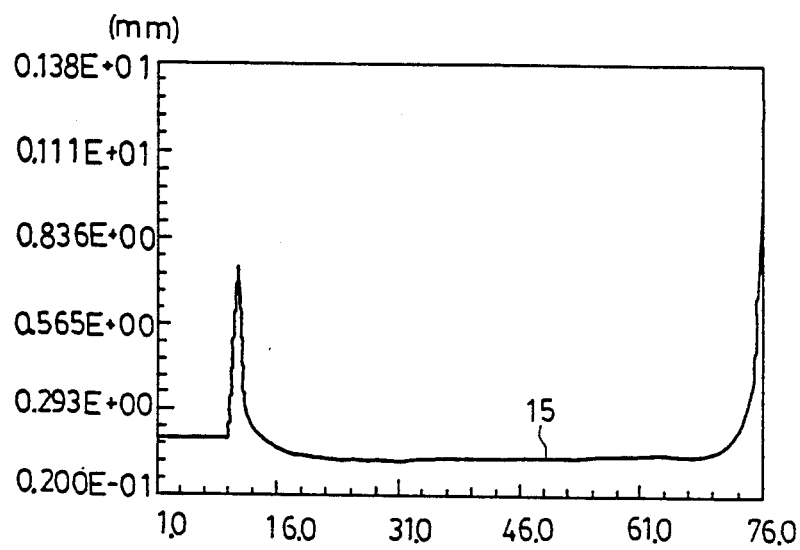
FIG. 8 illustrates the displacement of a grinding wheel relative to a workpiece for respective grinding strokes.

Additionally, the relative displacement between the grinding wheel and the gear blank for the removal of the metal within the respective areas 12 of the tooth face are measured so as to determine the relative displacement between the grinding wheel and the gear blank for respective stokes, as shown in FIG. 8. It is noted that the peak value of the relative displacement curve 15 denotes the magnitude of the preset distance between the grinding wheel and the gear tooth blank prior to machining. The relative displacement curve 15 is treated by a computer so as to proceed the computer numeric control for the relative displacement between the gear tooth blank and the grinding wheel.

As explained in the foregoing, in theory, since the gear tooth blank is ground at constant cutting rate as shown in FIG. 9, not only the deformation of the gear tooth blank and the grinding wheel, but also the undesired relative movement between the gear tooth blank and the grinding wheel during grinding process can be avoided. The efficiency of the grinding operation is therefore promoted.

Figure 11:
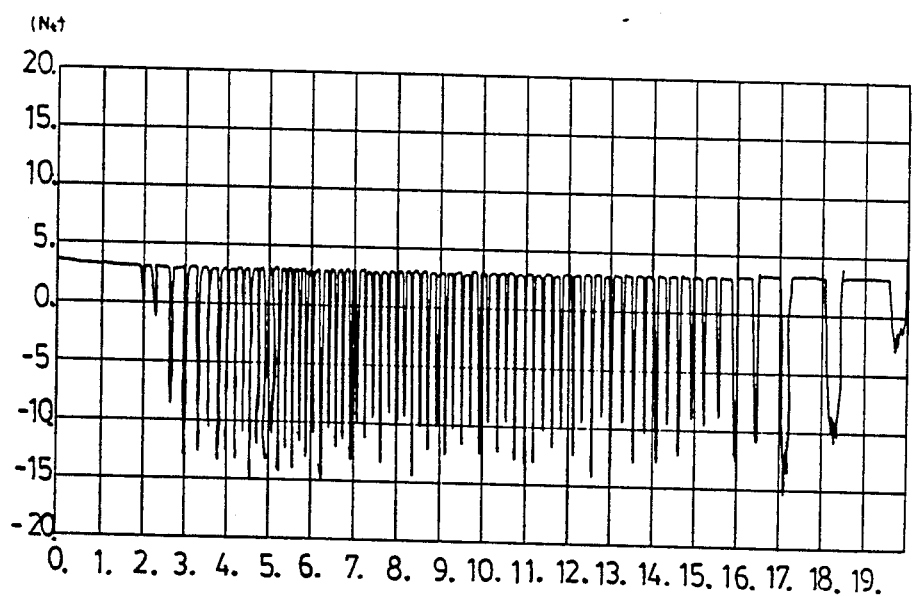
FIG. 11 illustrates the cutting force of respective grinding strokes in a test for grinding the first gear tooth blank to form an involute gear tooth in a test performed according to the process of the present invention.

Further, it has proven that the process of the present invention is practical. For example, in a test in which the module is 4, the number of teeth is 53, the press angle is 20 degrees, the preset distance between the grinding wheel and the gear tooth blank prior to machining is 0.1 mm, the workpiece is an AISI1040 spur gear blank, the eccentric distance of the gear tooth blank is 0.05 mm, the maximum error of the tooth shape is 17.1 μm, and the grinding wheel is a double-faced disk wheel having a cutter pressure angle of 15 degrees. The number of strokes is 76. The relative displacement curve is similar to that shown in FIG. 8. The removed area curve of the tooth face for respective grinding strokes is similar to that shown in FIG. 9. The cutting force curve is shown in FIG. 11. As a result, referring to FIG. 12, it is measured that the maximum error of the tooth shape after machining is only about 3.9 μm which corresponds to the 14-15 level of AISI and 0 level of JIS. In contrast, another spur gear blank having a maximum error of tooth shape of 14.9 μm is ground according to the conventional process under a condition the same as that of the test performed according to the process of the present invention. The number of the grinding strokes is also 76. Its cutting force curve is shown in FIG. 14 in which the variation of the cutting force for respective grinding strokes is significantly larger than that of FIG. 11. The maximum error of the tooth shape after machining is as high as about 10.2 μm which is significantly higher than that in the test performed according to the present invention. In other words, the process of the present invention has a higher accuracy and efficiency in comparison with the conventional process.

With the present invention thus explained, it is apparent that various modifications and variations can be made without departing from the scope and spirit of the present invention. For example, the cutter pressure angle of the double-faced disk wheel may be set at any angle smaller than 30 degrees. It is therefore intended that the present invention be limited only as indicated in the appended claims.

What is claimed is:

1. A process for grinding a gear tooth blank having a tooth face, with a grinding wheel having abrasive grains, to form an involute gear tooth, comprising the steps:
    (a) setting a predetermined cutting rate range so that each cutting rate within said range fails to result in burning between said grinding wheel and said gear tooth blank during a grinding operation;
    (b) determining the area of the tooth face to be removed during each of a predetermined number of grinding strokes in accordance with a cutting rate within said predetermined cutting rate range so that the amount of metal removed during each of said grinding strokes, except a last one of said grinding strokes, approaches a constant; and
    (c) removing the metal within said respective areas from said gear tooth blank, by sequentially effecting each of said grinding strokes, to form an involute gear tooth.

2. A process as claimed in claim 1, wherein said involute gear tooth formed in step (c) includes a tooth crest and a tooth flank, and wherein, during performance of step (c), the tooth crest is formed before the tooth flank is formed.

3. A process as claimed in claim 1, wherein said grinding wheel is a double-faced disk wheel having a cutter pressure angle smaller than 30 degrees.

4. A process as claimed in claim 1, further comprising a step, implemented before step (b), of dividing said gear tooth blank into a plurality of triangular areas so that said triangular areas determine the portion of said gear tooth blank to be removed during each of said grinding strokes.

* * * * *